US007315668B1

(12) United States Patent
Mahony

(10) Patent No.: US 7,315,668 B1
(45) Date of Patent: Jan. 1, 2008

(54) OPTICAL COUPLING WITH A TEST PORT

(75) Inventor: Glenn M. Mahony, Alpharetta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 665 days.

(21) Appl. No.: 10/183,922

(22) Filed: Jun. 25, 2002

(51) Int. Cl.
*G02B 6/12* (2006.01)
*G02B 6/28* (2006.01)

(52) U.S. Cl. ............................ 385/14; 385/16; 385/24

(58) Field of Classification Search .................. 385/16, 385/19, 24, 27, 31, 37, 45, 47, 15, 39, 46; 359/119, 127, 134; 372/6
See application file for complete search history.

(56) References Cited

U.S. PATENT DOCUMENTS

| | | | | |
|---|---|---|---|---|
| 4,671,608 A * | 6/1987 | Konishi | ........................ | 385/24 |
| 5,572,612 A * | 11/1996 | Delavaux et al. | ............. | 385/24 |
| 5,892,868 A * | 4/1999 | Peck et al. | ..................... | 385/34 |
| 5,898,801 A * | 4/1999 | Braun et al. | ................... | 385/24 |
| 5,956,439 A * | 9/1999 | Pimpinella | ..................... | 385/16 |
| 5,978,114 A * | 11/1999 | Clark et al. | ..................... | 398/43 |
| 6,011,885 A * | 1/2000 | Dempewolf et al. | ........... | 385/34 |
| 6,240,222 B1 * | 5/2001 | Bergmann | ...................... | 385/24 |
| 6,345,137 B1 * | 2/2002 | Imajo | ........................... | 385/46 |
| 6,348,984 B1 * | 2/2002 | Mizrahi | ........................ | 398/79 |
| 6,496,623 B2 * | 12/2002 | Asakura et al. | ................ | 385/47 |
| 6,552,834 B2 * | 4/2003 | Bhatia et al. | .................. | 398/87 |
| 6,782,157 B1 * | 8/2004 | Luo et al. | ...................... | 385/24 |
| 6,909,821 B2 * | 6/2005 | Ravasio et al. | ................ | 385/24 |
| 6,912,339 B2 * | 6/2005 | Whittaker | ..................... | 385/24 |
| 7,085,497 B2 * | 8/2006 | Tiemann et al. | ............. | 398/107 |
| 2006/0008203 A1 * | 1/2006 | Maeda | ......................... | 385/27 |

* cited by examiner

*Primary Examiner*—Tina M Wong
(74) *Attorney, Agent, or Firm*—Hope Baldauff Hartman, LLC

(57) ABSTRACT

An optical coupler comprises a first, second, third, and fourth port. The first port is for communicating optical signals with a processor. The second port receives a first optical signal and transmits the first optical signal to the first port. The third port receives a second optical signal and transmits the second optical signal to the first port. The fourth port receives a third optical signal and transmits the third optical signal to the first port.

17 Claims, 5 Drawing Sheets

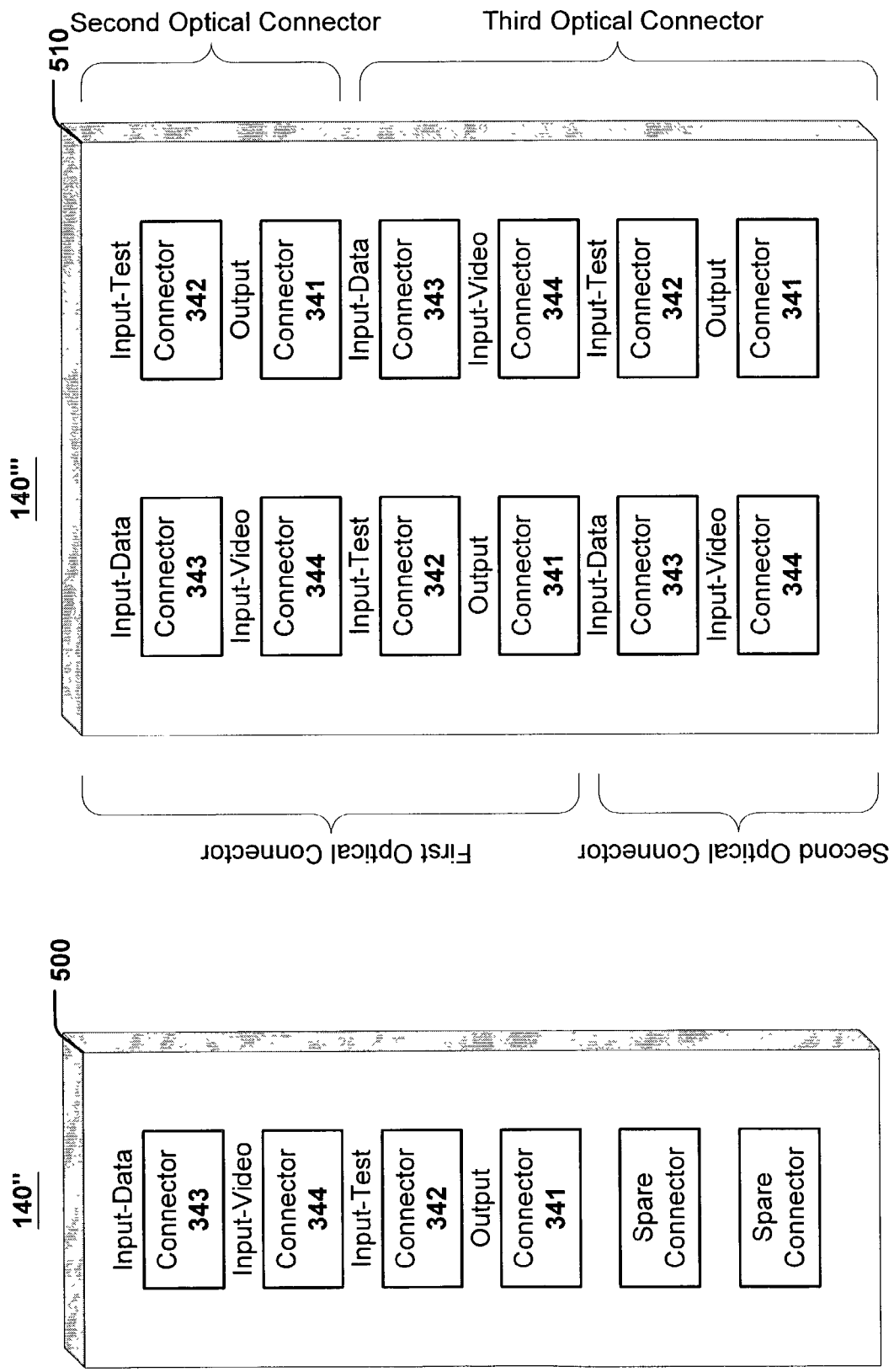

OPTICAL COUPLING WITH A TEST PORT

FIELD OF THE INVENTION

The invention generally relates to the field of optical communications. More particularly, the invention relates to optical coupling with a test port.

BACKGROUND OF THE INVENTION

The Internet has become increasingly popular in recent years and many homes (and offices, etc.) now have network connections to the Internet. Many portions of the Internet are already implemented with fiber optics and as such, these portions provide high speed communications. For example, fiber optics may exist between Internet Service Providers and distribution points, such as, for example, telephone central offices, cable head ends, and the like.

While some portions of the network connection are fiber optic based, other portions have not yet been implemented with fiber optics or have only been partially implemented with fiber optics. For example, the network connection from a distribution point to a home is typically implemented via a telephone line or a cable line, rather than a fiber optic cable. Because the communication speed of a telephone line or a cable line typically is slower than that of fiber optics, this portion of the network may become the bottleneck for data communication. To overcome this bottleneck, a fiber optic cable may be installed between the distribution point and the home, known as fiber-to-the-home (FTTH).

A typical installation of fiber-to-the-home may include several optical devices, such as, for example, fiber optic cables, optical connectors, optical splices, and the like. For such an installation to function well, the devices should be properly installed. For example, a fiber optic cable should not be excessively bent and optical connectors should be tight and properly aligned. To test for proper installation, an optical testing device may be applied to the distribution point end of a fiber optic cable. If the optical testing device determines that there is a problem, the installer may attempt to diagnose the problem from information provided by the testing device. Otherwise, the fiber optic cable may be connected to the distribution point.

After the fiber optic cables are installed and connected, the testing device may be used to diagnose problems that occur subsequently. This typically requires disconnecting the fiber optic cable at some point to attach the testing device. Such disconnection of the fiber optic cable, however, disrupts signal communication between the distribution point and the home. Such a disruption of communication may be inconvenient to users.

In view of the foregoing, there is a need for a device that provides the ability to test a portion of a fiber optic communication path without having to disrupt data communication.

SUMMARY OF THE INVENTION

An optical coupler comprises a first, second, third, and fourth port. The first port is for communicating optical signals with a processor. The second port receives a first optical signal and transmits the first optical signal to the first port. The third port receives a second optical signal and transmits the second optical signal to the first port. The fourth port receives a third optical signal and transmits the third optical signal to the first port.

The above-listed features, as well as other features, of the invention will be more fully set forth hereinafter.

BRIEF DESCRIPTION OF THE DRAWINGS

The optical coupler and an optical coupling system are further described in the detailed description that follows, by reference to the drawings by way of non-limiting illustrative embodiments in which like reference numerals represent similar parts throughout the drawings, and wherein:

FIGS. 5a and 5b are perspective views of illustrative modular optical couplers, in accordance with an embodiment of the invention.

DETAILED DESCRIPTION OF ILLUSTRATIVE EMBODIMENTS

The optical coupler has a port for connection of an optical testing device. With such an optical coupler, the optical testing device may be connected to an optical network connection or any optical communication medium, and the network connection may be tested without disruption of signal communication.

Figure 1:
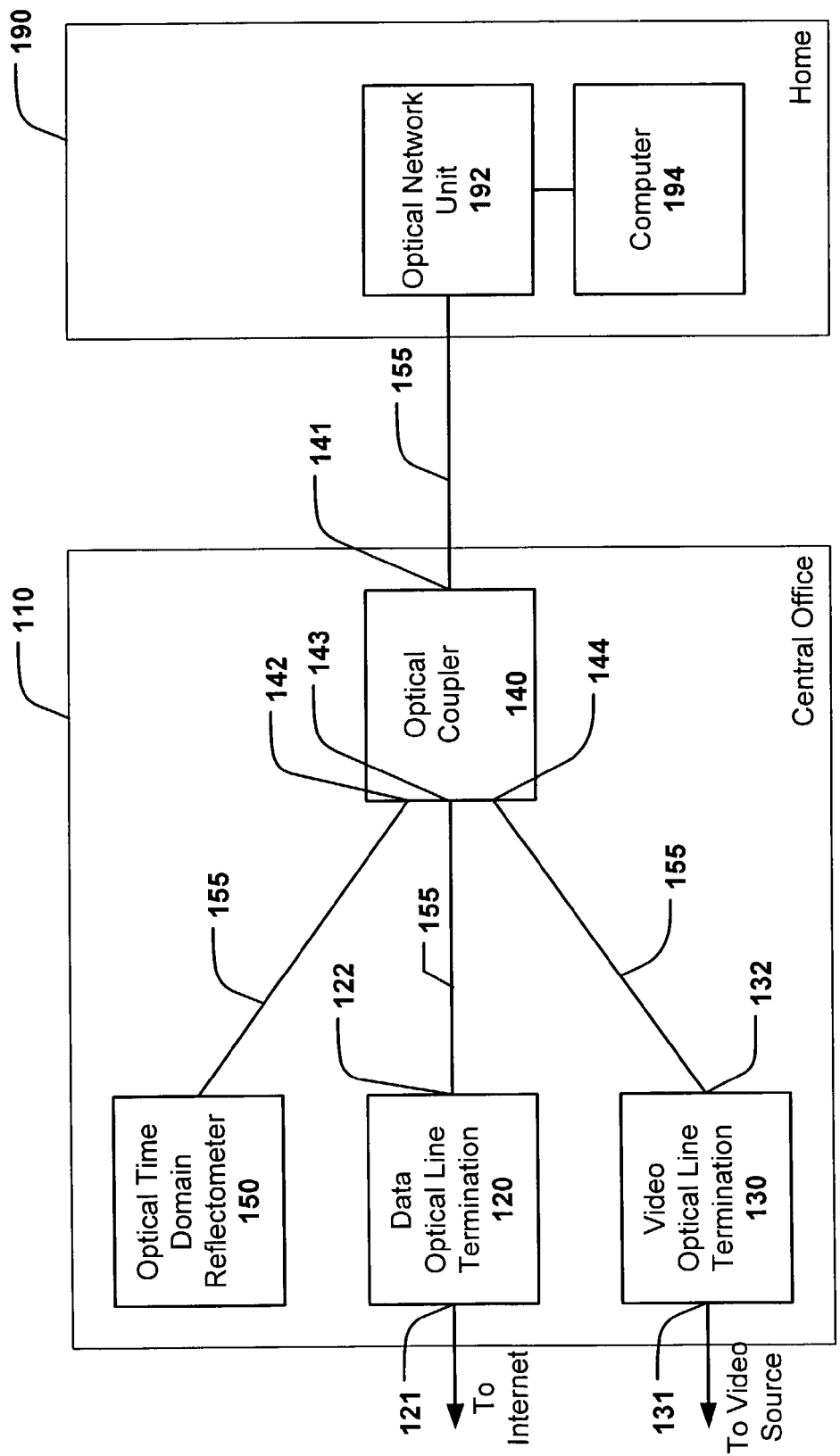
FIG. 1 is a diagram of an illustrative fiber optic network connection to a home, in accordance with an embodiment of the invention.

FIG. 1 shows a passive optical network that can provide optical signals from a distribution point to an end user at a home. A passive optical network is a high bandwidth point to multipoint optical fiber network that may based on asynchronous transfer mode protocol, Ethernet, TDM, or the like. Depending on where the passive optical network terminates, the network can be described as fiber-to-the-curb, fiber-to-the-building, or fiber-to-the-home (FTTH). The term "passive" describes a network connection in which there are no power requirements or active electronic parts between the distribution point and the home. As shown in FIG. 1, central office 110 may function as the distribution point for distributing optical signals. While the distribution point is illustrated as central office 110, the distribution point may be a cable head end or any other distribution point for optical signals.

Central office 110 may include a data optical line termination 120, a video optical line termination 130, and an optical coupler 140. Data optical line termination 120 is shown as being optically connected to optical coupler 140 via a fiber optic cable 155. Video optical line termination 130 is shown as being optically connected to optical coupler 140 via another fiber optic cable 155.

Data optical line termination 120 comprises a first port 121 and a second port 122. First port 121 may communicate data signals with a network, such as, for example, the Internet, a local area network, a wide area network, another communication device, and the like. Second port 122 may communicate data signals with home 190. In this manner, home 190 can communicate with a network, such as the Internet. Data signals may include data such as, for example, e-mails, web pages, audio files, video files, and the like.

First port 121 typically communicates signals optically; however, first port 121 may communicate signals in other forms, such as, for example, electrical signals, wireless signals, and the like. Second port 122 optically communicates data signals with home 190 via optical coupler 140. Data optical line termination 120, therefore, may convert between electrical signals and optical signals, between wireless signals and optical signals, or may function as a repeater of optical signals.

Video optical line termination 130 comprises a first port 131 and a second port 132. First port 131 may communicate video signals with a video source (e.g., a video headend) as shown or with any other communication device. Second port 132 communicates the video signals with home 190 via optical coupler 140. Typically, video signals are received from the video source and sent to home 190, for example, for transmission of a movie, a television show, and the like. First port 131 typically communicates signals optically; however, first port 131 may communicate in other forms, such as, for example, electrical signals, wireless signals, and the like. Video optical line termination 130, therefore, may convert between electrical signals and optical signals, wireless signals and optical signals, or may function as a repeater of optical signals.

Optical coupler 140 receives data signals from data optical line termination 120 and receives video signals from video optical line termination 130. Optical coupler 140 combines the data signals and the video signals for communication over a single optic fiber. One technique for combining the signals is wave division multiplexing. Wave division multiplexing combines data from different sources together on an optical fiber, with each signal being carried at the same time on its own separate light wavelength. One advantage with such a technique is that each signal may be de-multiplexed and processed separately and as such, different signal formats and different signal rates can be transmitted simultaneously on the same optic fiber. For example, an Internet Protocol (IP) signal, a Synchronous Optical Network signal, and an asynchronous transfer mode signal can all be traveling at the same time within the optic fiber.

The combined signals may be sent to home 190 via a fiber optic cable 155. Home 190 may include an optical network unit 192 and a computer 194. Computer 194 may alternatively be any data or video appliance, such as, for example, a television, a set top box, a telephone, and the like. While an optical line termination 120 or 130 may typically communicate with up to thirty-two optical network units 192, for clarity, only one optical network unit 192 is shown. Optical network unit 192 receives optical signals from optical coupler 140 and de-multiplexes the signals. For example, optical network unit 192 may receive the multiplexed data signal and video signal and de-multiplex the data and video signal for presentation to computer 194 as two separate signals.

Further, optical network unit 192 may receive data signals from computer 194 and may send the received data signal to optical coupler 140 via fiber optic cable 155. For example, optical coupler 140 may receive data signals from computer 194 and route those data signals to data optical line termination 120, for example. Such routing may be implemented with multi-mode interference coupling that may include a Bragg grating structure comprised of planar SiON/SiO2 waveguides, InGaAsP/InP waveguides, and the like. Further, optical coupler 140 may be manufactured using fused biconic technology, diffraction grading, planar devices, or the like.

As can be seen, optical coupler 140 allows at least two different signals to be sent to computer 194 over a single optic fiber. In addition to providing such multiplexing of video and data signals, optical coupler 140 provides the ability to test the integrity of the fiber optic network connection between optical coupler 140 and optical network unit 192. Such testing may be initiated to identify problems in the transmission path, such as, for example, a broken fiber optic cable 155, an excessively bent fiber optic cable 155, and the like. Fiber optic cable 155 may further include optical splices, optical connectors, and the like that may over time, cause signal communication problems that could also bring about such testing. For example, an optical splice may vibrate loose and cause increased signal communication errors.

With a conventional fiber optic network connection, to test the network, one of the fiber optic cables 155 typically is disconnected and then connected to an optical testing device. For example, with a conventional coupler, the video connection may be disconnected to make a place to connect the optical testing device. The optical testing device is then used to determine the cause of the signal communication errors. Such disconnection, however, disrupts signal communication with home 190. Advantageously, optical coupler 140 includes the ability to connect an optical testing device and perform optical testing while communication continues uninterrupted between the Internet and computer 194.

To test the network connection, an optical time domain reflectometer 150 may be connected to a test port of optical coupler 140. Alternatively, any other optical testing device may be connected to the test port of optical coupler 140.

Optical time domain reflectometer 150 is an optoelectronic instrument that may be used to characterize an optical component, such as, for example, an optical fiber, an optical communication path, an optical communication network, and the like. Optical time domain reflectometer 150 injects a series of optical pulses into the optical component being tested. It also receives, from the same end of the optics under test, light that is scattered and reflected back from the optical component. The intensity of the return pulses is measured and integrated as a function of time, and is plotted as a function of fiber length. Optical time domain reflectometer 150 may be used for estimating fiber optic length and overall attenuation, including splice and mated-connector losses. It may also be used to locate faults, such as breaks, excessive bends, and the like.

Optical coupler 140 combines data signals, video signals, and test signals for communication over a single optic fiber, for example, using wave division multiplexing. Because the test signal is carried on its own separate light wavelength, it does not interfere with the communication of the data and video signals. Moreover, because optical coupler 140 may combine the test signals, data signals, and video signals, the fiber optic connection does not have to be disconnected, thereby allowing data and video communication to continue.

Figure 2:
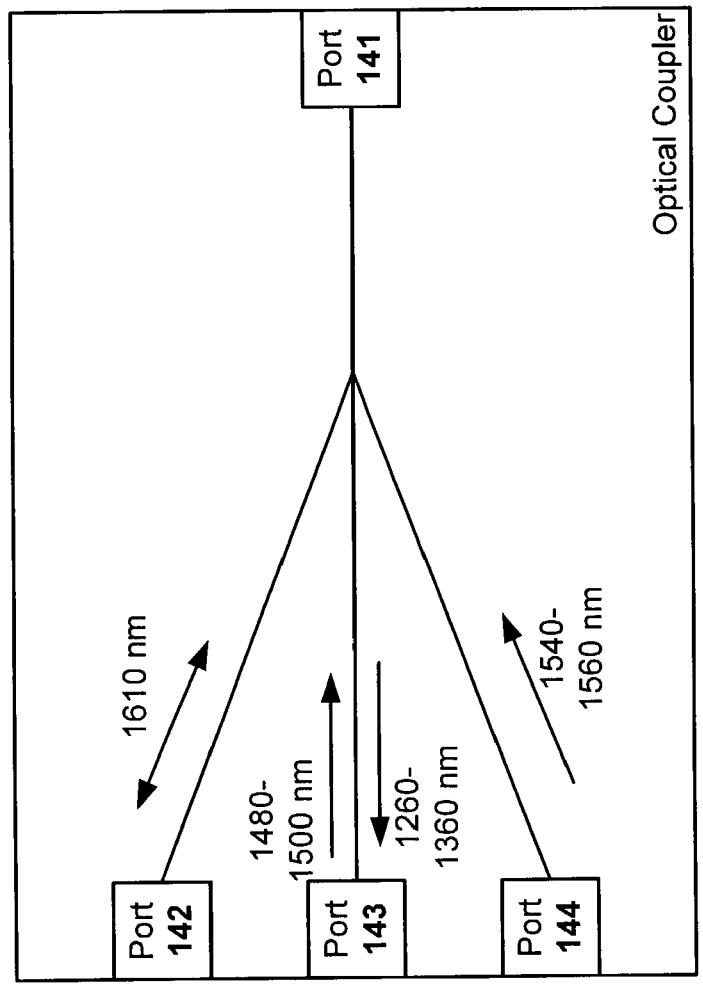
FIG. 2 is a diagram of an illustrative optical coupler, in accordance with an embodiment of the invention.

Further details of optical coupler 140 are shown in FIG. 2. As shown in FIG. 2, optical coupler 140 comprises a first port 141, a second port 142, a third port 143, and a fourth port 144. First port 141 is for communicating optical signals with computer 194.

Optical coupler 140 may be adapted to conform to ITU-T Recommendation G.983.3, hereinafter "G.983.3." G.983.3 defines an allocation of wavelengths for the multiplexed optical signals in a FTTH system. G.983.3 allocates wavelengths of 1480 to 1500 nanometers for transmission of data signals to the home and wavelengths of 1260 to 1360 nanometers for transmission of data signals from the home. G.983.3 also allocates wavelengths for an "enhancement band." The enhancement band allocation typically is used for video signals and has two options. The first option allocates wavelengths of 1539 to 1565 nanometers and the second option allocates wavelengths of 1550 to 1560 nanometers. Optical coupler 140 will be described below as complying with G.983.3; however, optical coupler 140 need not comply with G.983.3 but may use any allocation of wavelengths.

Second port 142 of optical coupler 140 receives a first optical signal and transmits the first optical signal to first port 141 with limited signal loss (e.g., the signal loss may be less 2 dB or may be less than 1 dB). Alternatively, the first optical signal is transmitted to first port 141 with substantially no signal loss. The first optical signal may be a test signal from optical time domain reflectometer 150. Optical coupler 140 may use wave division multiplexing to transmit the first optical signal to end user port 141. In this manner, the test signal is carried on its own wavelength and does not interfere with other signals. Since G.983.3 does not allocate a wavelength band for test signals, any test signal wavelength may be used, such as for example, 1610 nanometers. With such a test signal wavelength, optical coupler 140 may be adapted so that wavelengths of about 1610 nanometers are transmitted to first port 141 with limited signal loss. Any wavelength can be used but typically a wavelength that does not interfere with other signals is used.

Once the test signal is reflected back (e.g., from computer 194 or from other optical connectors) to optical coupler 140, first port 141 may receive test signal. In more detail, first port 141 receives the reflected test optical signal (e.g., a series of optical pulses having a wavelength of 1610 nanometers) from first port 141. Optical coupler 140 may use wave division de-multiplexing to transmit the test optical signal to second port 142 with limited signal loss (e.g., the signal loss may be less 2 dB or may be less than 1 dB). Alternatively, the test optical signal is transmitted to second port 142 with substantially no signal loss. Therefore, optical coupler 140 may be adapted so that test optical signals received at first port 141 having a wavelength of about 1610 nanometers are transmitted to second port 142 with limited signal loss. In this manner, optical time domain reflectometer 150 may receive the test signal as if it were connected directly to the fiber optic network connection being tested.

Third port 143 receives a second optical signal and transmits the second optical signal to first port 141 with limited signal loss (e.g., the signal loss may be less 2 dB or may be less than 1 dB). Alternatively, the second optical signal is transmitted to first port 141 with substantially no signal loss. The second optical signal may be a data signal from data optical line termination 120. Optical coupler 140 may use wave division multiplexing to transmit the second optical signal to first port 141. G.983.3 allocates a wavelength band for data signals of 1480 to 1500 nanometers. Therefore, optical coupler 140 may be adapted so that optical signals having a wavelength of about 1480 to about 1500 nanometers are transmitted to first port 141 with limited signal loss. In this manner, the data signal is carried on its own wavelength and does not interfere with other signals.

Fourth port 144 receives a third optical signal and transmits the third optical signal to first port 141 with limited signal loss (e.g., the signal loss may be less 2 dB or may be less than 1 dB). Alternatively, the third optical signal is transmitted to first port 141 with substantially no signal loss. The third optical signal may be a video signal from video optical line termination 120. Optical coupler 140 may use wave division multiplexing to transmit the third optical signal to first port 141. G.983.3 allocates a wavelength band for data signals of 1539 to 1565 nanometers for the enhancement band. Therefore, optical coupler 140 may be adapted so that optical signals having a wavelength of about 1540 to about 1560 nanometers are transmitted to first port 141 with limited signal loss. In this manner, the video signal is carried on its own wavelength and does not interfere with other signals.

Optical coupler 140 may also receive a fourth optical signal from first port 141. The fourth optical signal may be a data signal from computer 194. Optical coupler 140 may use wave division de-multiplexing to transmit the fourth optical signal to third port 143 with limited signal loss with limited signal loss (e.g., the signal loss may be less 2 dB or may be less than 1 dB). Alternatively, the fourth optical signal is transmitted to third port 143 with substantially no signal loss. G.983.3 allocates a wavelength band for data signals of 1260 to 1360 nanometers for such signals. Therefore, optical coupler 140 may be adapted so that optical signals received at first port 141 having a wavelength of about 1260 to about 1360 nanometers are transmitted to third port 143 with limited signal loss.

Figure 3:
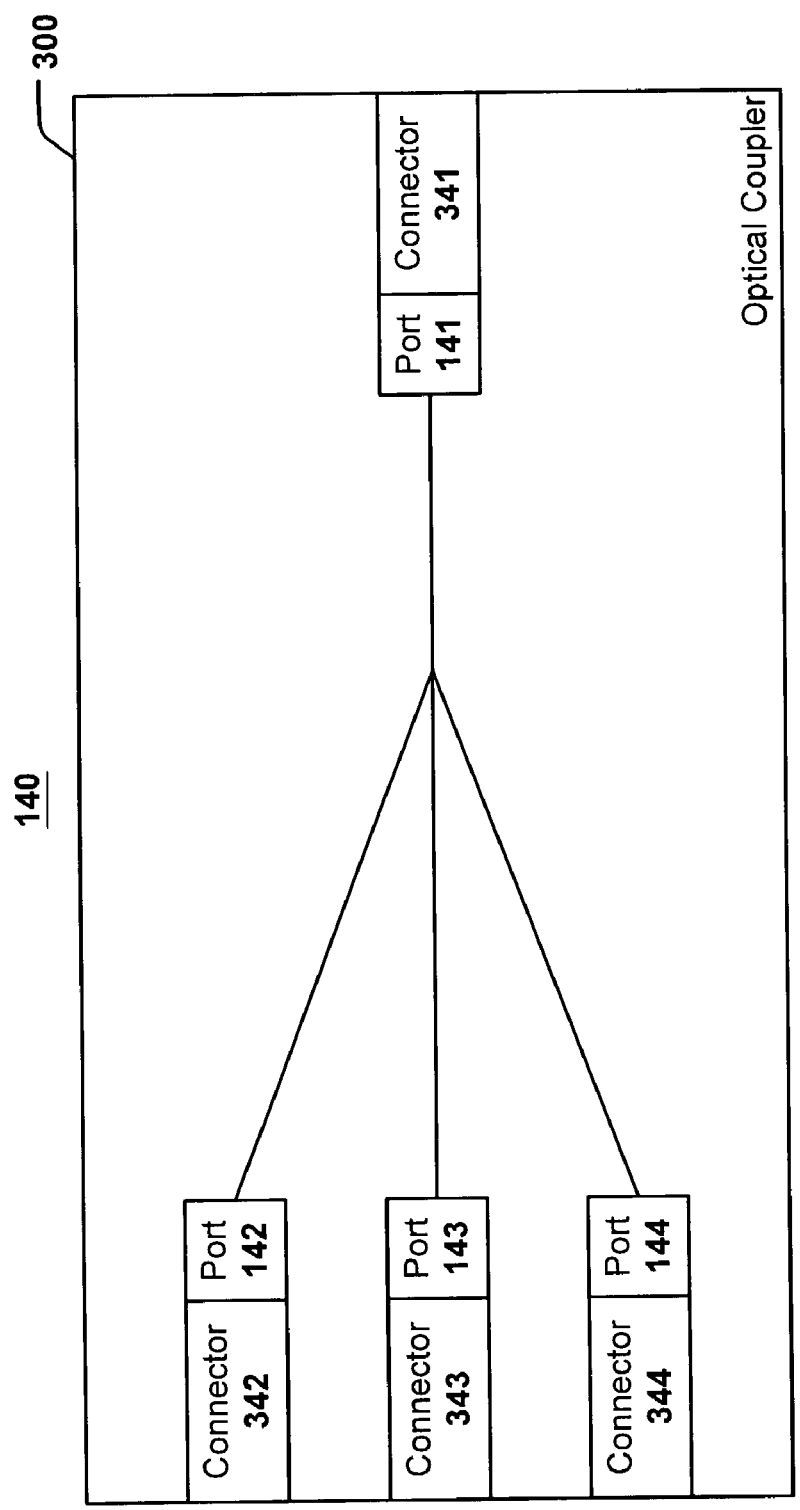
FIG. 3 is a diagram of an illustrative optical coupler including connectors, in accordance with an embodiment of the invention.

As can be seen, optical coupler 140 provides a device that can multiplex optical signals and can also provide for optical testing without disrupting data and video signal communication. That is, optical time domain reflectometer 150 may be connected to a test port (e.g., second port 142) of optical coupler 140 for testing of the network connection. To make such connection simple, optical coupler 140 may also comprise connectors to facilitate installation and testing. FIG. 3 shows optical coupler 140 including illustrative connectors. As shown in FIG. 3, first port 141 comprises a first optical connector 341, second port 142 comprises a second optical connector 342, third port 143 comprises a third optical connector 343, and fourth port 144 comprises a fourth optical connector 344. Optical connectors 341, 342, 343, and 344 may be mounted to a substrate 300. Substrate 300 may be a printed circuit board, a card, or the like. Optical connectors 341, 342, 343, and 344 may comprise a SC type connector, a ST type connector, a FC type connector, or the like.

Figure 4:
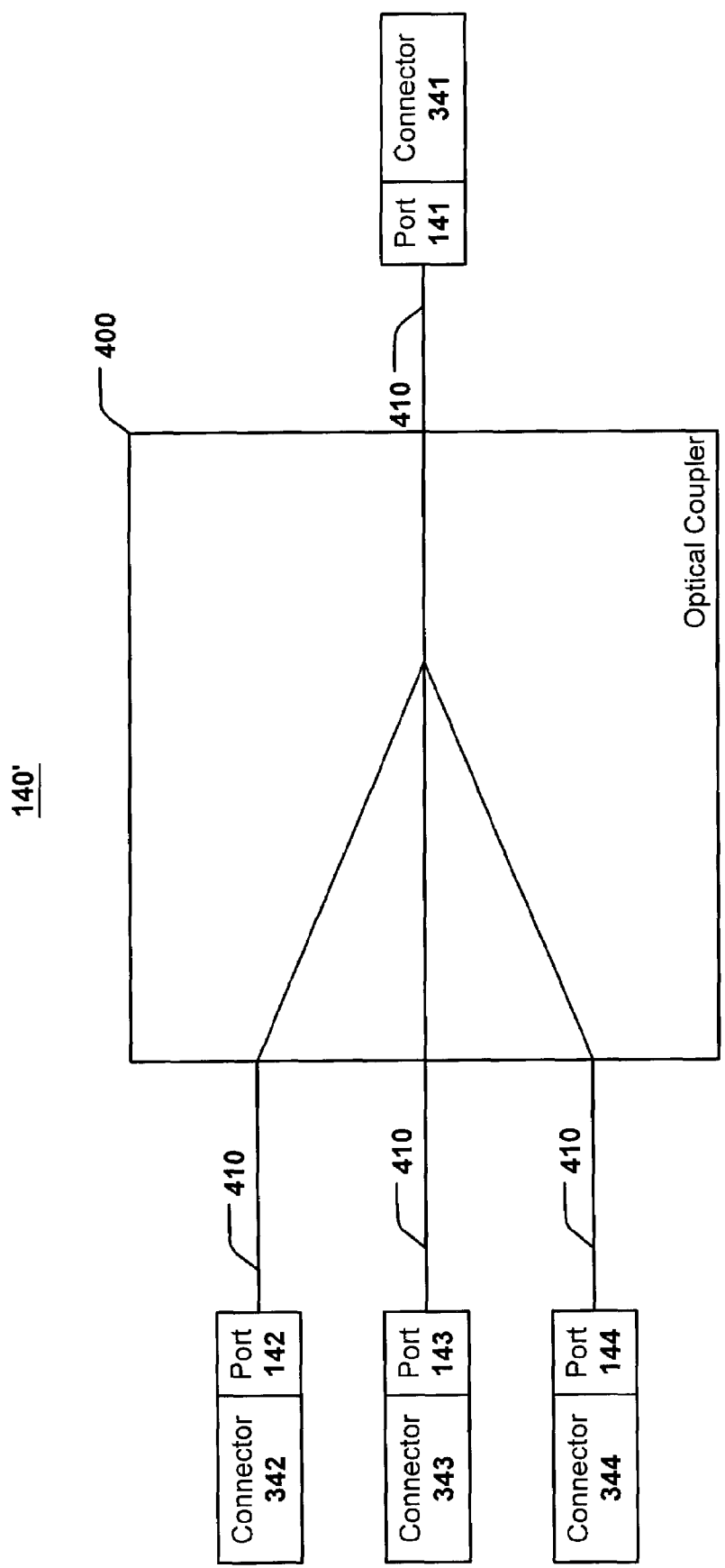
FIG. 4 is a diagram of an illustrative optical coupler including pigtail style connectors, in accordance with an embodiment of the invention.

FIG. 4 shows an alternative illustrative optical coupler 140' including pigtail type connections. A pigtail type connection is a short length of jacketed fiber optic permanently fixed to a component or substrate at one end and a connectorized termination at the other end. As shown in FIG. 4, first port 141 comprises a first optical connector 341 connected to a substrate 400 via a pigtail connection 410, second port 142 comprises a second optical connector 342 connected to a substrate 400 via a pigtail connection 410, third port 143 comprises a third optical connector 343 connected to a substrate 400 via a pigtail connection 410, and fourth port 144 comprises a fourth optical connector 344 connected to a substrate 400 via a pigtail connection 410.

FIG. 5a shows another alternative illustrative optical coupler 140" including a modular housing. As shown in FIG. 5a, optical connectors 341, 342, 343, and 344 are mounted to a face of housing 500. Housing 500 may be a modular housing and may be adapted to be rack mounted, panel mounted, and the like. With such modularity, housings 500 may be more easily installed and removed from a cabling enclosure (not shown), thereby providing for maintenance, replacement, and expansion.

FIG. 5b shows yet another illustrative optical coupler 140''' including a housing 510 for receiving multiple optical couplers. As shown in FIG. 5b, housing 510 houses three optical couplers, however, any number is possible.

It is noted that the foregoing description has been provided merely for the purpose of explanation and is in no way to be construed as limiting of the invention. While the invention has been described with reference to illustrative embodiments, it is understood that the words which have been used herein are words of description and illustration, rather than words of limitation. Further, although the invention has been described herein with reference to particular structure, methods, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. An optical signal distribution point, comprising:
   an optical testing device operative to provide a test optical signal for testing a network connection between a bidirectional optical coupler and a processor; and
   the bidirectional optical coupler, comprising:
   a first port operative to communicate bidirectional optical signals to the processor external to the optical coupler,
   a second port coupled to the first port, the second port operative to:
   connect only with the optical testing device,
   receive the test optical signal from the optical testing device, and
   transmit the test optical signal to the first port, the test optical signal having a first wavelength,
   a third port coupled to the first port, the third port operative to:
   receive a first non-test optical signal having a second wavelength, and
   transmit the first non-test optical signal to the first port, and
   a fourth port coupled to the first port, the fourth port operative to:
   receive a second non-test optical signal having a third wavelength, and
   transmit the second non-test optical signal to the first port.

2. The optical signal distribution point of claim 1, wherein the second port is further operative to transmit the test optical signal from the optical testing device without interrupting transmission of the first and second non-test optical signals.

3. The optical signal distribution point of claim 1, wherein the optical testing device is an optical time domain reflectometer.

4. The optical signal distribution point of claim 1, wherein the first non-test optical signal comprises a data signal, and the second non-test optical signal comprises a video signal.

5. The optical signal distribution point of claim 1, wherein the test optical signal has a wavelength of about 1610 nanometers, the first non-test optical signal has a wavelength of between about 1480 and about 1500 nanometers, and the second non-test optical signal has a wavelength of between about 1540 and about 1560 nanometers.

6. The optical signal distribution point of claim 1, wherein the first port is further operative to receive a third non-test optical signal and transmit the third non-test optical signal to the third port with a signal loss of less than 2 decibel.

7. The optical signal distribution point of claim 1, wherein the first port is further operative to receive a fourth non-test optical signal and transmit the fourth non-test optical signal to the third port with a signal loss of less than 1 decibel.

8. The optical signal distribution point of claim 6, wherein the third non-test optical signal comprises a data signal having a wavelength of between about 1260 and about 1360 manometers.

9. The optical signal distribution point of claim 1, wherein the first port is further operative to receive a test reply optical signal and transmit the test reply optical signal to the second port with a signal loss of less than 2 decibel.

10. The optical signal distribution point of claim 1, wherein the first port is further operative to receive a test reply optical signal and transmit the test reply optical signal to the second port with a signal loss of less than 1 decibel.

11. The optical signal distribution point of claim 1, wherein the test optical signal comprises optical pulses having a wavelength of about 1610 nanometers.

12. The optical signal distribution point of claim 1, wherein the first port comprises a first optical connector, the second port comprises a second optical connector, the third port comprises a third optical connector, and the fourth port comprises a fourth optical connector.

13. The optical signal distribution point of claim 12, wherein each of the optical connectors comprises a pigtail fiber optic connector, a SC type connector, a ST type connector, and a FC type connector.

14. The optical signal distribution point of claim 12, further comprising a housing comprising a face, the first optical connector, the second optical connector, the third optical connector, and the fourth optical connector each being disposed in the face of the housing.

15. The optical signal distribution point of claim 14, wherein the housing is a modular housing.

16. An optical signal distribution point, comprising:
    an optical testing device operative to provide a test optical signal for testing a network connection between a bidirectional optical coupler and a processor; and
    the bidirectional optical coupler, comprising:
    a first port operative to communicate bidirectional optical signals to the processor external to the optical coupler,
    a second port coupled to the first port, the second port operative to:
    connect only with the optical testing device,
    receive the test optical signal from the optical testing device, and
    transmit the test optical signal to the first port with a signal loss of less than 2 decibel, the test optical signal having a first wavelength,
    a third port coupled to the first port, the third port operative to:
    receive a first non-test optical signal having a second wavelength, and
    transmit the first non-test optical signal to the first port with a signal loss of less than 2 decibel, and
    a fourth port coupled to the first port, the fourth port operative to:
    receive a second non-test optical signal having a third wavelength, and
    transmit the second non-test optical signal the first port with a signal loss of less than 2 decibel.

17. An optical signal distribution point, comprising:
    an optical testing device operative to provide a test optical signal for testing a network connection between a bidirectional optical coupler and a processor; and the bidirectional optical coupler, comprising:
- a first port operative to communicate bidirectional optical signals to the processor external to the optical coupler,
- a second port coupled to the first port, the second port operative to:
  - connect only with the optical testing device,
  - receive the test optical signal from the optical testing device, and
  - transmit the test optical signal to the first port with a signal loss of less than 1 decibel, the test optical signal having a first wavelength,
- a third port coupled to the first port, the third port operative to:
  - receive a first non-test optical signal having a second wavelength, and
  - transmit the first non-test optical signal to the first port with a signal loss of less than 1 decibel, and
- a fourth port coupled to the first port, the fourth port operative to:
  - receive a second non-test optical signal having a third wavelength, and
  - transmit the second non-test optical signal to the first port with a signal loss of less than 1 decibel.

* * * * *

UNITED STATES PATENT AND TRADEMARK OFFICE
CERTIFICATE OF CORRECTION

PATENT NO. : 7,315,668 B1
APPLICATION NO. : 10/183922
DATED : January 1, 2008
INVENTOR(S) : Glenn M. Mahony It is certified that error appears in the above-identified patent and that said Letters Patent is hereby corrected as shown below:

In the Claims

Column 8, lines 5-8, should read:
8. The optical signal distribution point of claim 6, wherein the third non-test optical signal comprises a data signal having a wavelength of between about 1260 and about 1360 ~~manometers~~ nanometers.

Signed and Sealed this

Twenty-second Day of July, 2008

JON W. DUDAS
*Director of the United States Patent and Trademark Office*